United States Patent Office 3,694,401
Patented Sept. 26, 1972

3,694,401
NOVEL POLYURETHANE FILMS
Jürgen Gärtner, 32 Zonser Strasse, 4 Dusseldorf, Germany
No Drawing. Filed Oct. 22, 1970, Ser. No. 83,192
Claims priority, application Germany, Oct. 28, 1969,
P 19 54 174.3
Int. Cl. C08g 22/08
U.S. Cl. 260—37 N          8 Claims

ABSTRACT OF THE DISCLOSURE

Novel polyurethane polymers formed by reacting a polyisocyanate with a polyepoxide copolymer of 3,3-bis-(chloromethyl)-oxetane and 3-alkyl - 3 - hydroxymethyl-oxetane and optionally-3-chloromethyl-3-hydroxymethyl-oxetane which are resistant to hydrolysis.

STATE OF THE ART

Various plastic materials containing polyurethane groups from so-called esterpolyols or polyetherpolyols are known and the resulting polyurethanes are suitable for a large variety of uses, particularly for the manufacture of coating materials. The coatings produced from polyesters containing hydroxy groups and from polyethers frequently have poor resistance to hydrolyzing agents.

OBJECTS OF THE INVENTION

It is an object of the invention to obtain novel polyurethane prepolymers containing free isocyanate groups and the fully cured polymers derived therefrom which have excellent chemical resistance.

It is another object of the invention to provide a novel process for preparing chemically resistant coatings.

These and other objects and advantages of the invention will become obvious from the following detailed description.

THE INVENTION

The novel urethaneprepolymer of the invention containing free isocyanate groups is prepared by reacting a polyisocyanate with a polyhydroxy polymer of 3,3-bis-(chloromethyl)oxetane and 3-alkyl-3-hydroxymethyl-oxetane wherein the alkyl has 1 to 24 carbon atoms and optionally containing 3-chloromehtyl-3-hydroxymethyl-oxetane. Preferably the 3-alkyl substituent has 1 to 3 carbon atoms.

The invention also is directed to a coating composition or lacquer containing as the coating agent the said urethane prepolymer as the basic coating agent. The coating compositions may contain auxiliary coating additives to perform their function such as stability towards light or as a flow-improving material such as silicone oils or cellulose acetobutyrate. In some cases, it is advisable to add substances for protection against ageing and to add pigments to the binders. Suitable pigments are metal oxides or metal sulfides such as titanium dioxide, iron oxide, zinc sulfide or cadmium sulfide.

The coating compositions may also contain soot, organic pigments and dyestuffs. It is also preferred to use besides the said polymer up to 30% by weight of a lower polyhydric alcohol such as butylene glycol, diethylene glycol, glycerine, trimethylolethane or trimethylolpropane.

The polymer to be reacted with the polyisocyanates is prepared by ring opening polymerization in a known fashion. The 3,3-bis-(chloromethyl)-oxetane can be simply obtained from the corresponding derivatives of pentaerythritol. For example, it may be continuously obtained in good yields from the cyclic sulfurous ester of pentaerythritol dichlorohydrin.

The 3-alkyl-3-hydroxymethyl-oxetanes are known compounds which can be obtained in an analogous fashion from the cyclic carbonic acid ester of 2-hydroxymethyl-2-alkyl-propanediols-1,3. The alkyl radical may be ethyl, methyl, propyl, hexyl, 2-ethylhexyl, dodecyl, octadecyl, etc. The polymer may also contain up to 60% preferably 10 to 20% by weight of 3-chloromethyl-3-hydroxymethyl-oxetane.

The ring opening polymerization is effected with Lewis acids and particularly favorable results are obtained with boron trifluoride or its etherates or hydrates. Stannic chloride or gallium trichloride are also suitable. The polymer should contain 40 to 95 mole percent, preferably 80 to 90 percent of 3,3-bis-(chloromethyl)-oxetane.

The polyisocyanates reacted with the said polymer are known and examples of said isocyanates are isomeric toluoylene di-isocyanates, commercially available 4,4'-diphenylmethane di-isocyanate in pure or unpurified form, naphthalene di-isocyanate, 4,4'-dicyclohexylmethane di-isocyanate, hexamethylene di-isocyanate, isophorene di-isocyanate or isocyanates derived from dimerized fatty acids or the addition product of 3 moles of toluoylene di-isocyanate to 1 mole of trimethylolpropane. Also, polyvalent isocyanates formed by polymerization or polyaddition of divalent isocyanates such as toluoylene di-isocyanate or hexamethylene di-isocyanate may be used. When used as a coating agent, particularly advantageous is the use of 2,4-toluoylene di-isocyanate or 4,4'-diphenylmethane di-isocyanate. The polyisocyanate is preferably used in 1.6 to 2.0 mole ratio with the polymer.

The plastics containing polyurethane groups may be made in known fashion from the polyisocyanate and the polymer either directly from the ingredients in one step or by the prepolymer intermediate. Both casting materials and elastomers can be made by these processes and the latter can be directly applied to substrates to act as hydrolysis resistant coatings.

A further aspect of the invention is to provide a process for providing a substrate with a coating of the plastic material and also to the said coated substrates.

The prepolymer process is suitably used for the production of coating materials which can be particularly applied from solvents inert towards the isocyanate groups such as methyl isobutyl ketone, toluene, xylene, and alkyl glycol acetates.

The final crosslinking in this case may be effected with an excess of hydroxy compounds such as polyhydric alcohols or by moisture. The prepolymers can be made to give coatings which harden within a few hours especially after the addition of a catalyst such as an amine, i.e. triethyleneamine or tetrahydroxypropyl ethylenediamine or a metal catalyst, i.e. dibutyltin dilaurate, stannous octoate or phenyl mercury acetate or phenyl mercury propionate.

The polyurethane plastics obtained by the invention especially the coatings, are superior to polyurethanes based on polyesters or polyethers containing more than one hydroxy group in the molecule due to their greater stability. They are particularly resistant to sulfuric acid, acetic acid or sodium hydroxide.

The coatings may be applied to a variety of bases such as iron, steel, aluminum, leather, paper or wood with excellent adherence. They give good protection to the bases against corrosive gases or vapors.

In the following examples there are described several preferred embodiments to illustrate the invention. However, it should be understood that the invention is not intended to be limited to the specific embodiments.

Example I 155 g. of 3,3-bis-(chloromethyl)-oxetane, 23.5 g. of 3-ethyl-3-hydroxymethyl-oxetane, and 0.5 cc. of 48%

BF₃ ethearate were placed in a 500 cc. three-necked flask provided with a stirrer, reflux condenser and a dropping funnel. The temperature rose slowly to 53° C. and then a further 0.5 cc. of the BF₃ etherate was added. The mixture was then heated to 80° C. and upon attaining this temperature, a further 0.5 cc. of BF₃ etherate was added. The reaction mixture became more and more viscous and attained a maximum temperature of 104° C. After cooling the reaction mixture, 100 cc. of xylene were added and the mixture was heated at 100° C. for a further 2 hours. 300 cc. of xylene were then added to the reaction mixture and the organic phase was thoroughly washed with water. The solvent was distilled off in vacuo from the reaction mixture to obtain a clear, slightly yellow resinous copolymer product having an OH value of 82.5.

Coating mixtures were formed from the said copolymer by placing varying amounts of the copolymer, 1,3-butylene glycol, trimethylolpropane (TMP), cellulose acetobutyrate (CAB), toluene and xylene in a glass flask of 1 liter capacity which was provided with a stirrer, an internal thermometer, a nitrogen connection and a water separator. The mixtures were first dewatered azeotropically by heating to about 130° C. and recycling the solvent, and after cooling to about 100° C. 20 g. of ethyl glycol acetate (EGA) and methylisobutylketone (MiBK) were added thereto. After cooling the mixture to 40° C., various amounts of 2,4-toluylene di-isocyanate (TDI) or 4,4'-diphenylmethane di-isocyanate (MDI) were added. After the exothermic reaction had subsided, the mixture was heated for another 3 hours at 90° C. During the whole time, the reaction mixture was stirred in an atmosphere of dry nitrogen.

In the following Table I, the number of the batch is given in the first column and the amount of copolymer and other reactants used are given in the following columns. All the data are given in grams and the above-mentioned abbreviations have been used.

were then examined and the results are reported in Table III. In the said table, $u$ means unaltered, $t$ is slight turbidity, $be$ is softening and brown coloration and $g$ is slight yellowing.

TABLE III

| Batch No. | 75% H₂SO₄ 2 hours | 50% H₂SO₄ 23 hours | 20% NaOH 47 hours | Acetic acid 80% 167 hours |
|---|---|---|---|---|
| 1 | u | u | t | be |
| 2 | g | u | t | be |
| 3 | t | u | t | be |
| 4 | t | u | u | be |

The results of Table III show that the films of the invention possess excellent resistance to strong acid and alkalis which are strong hydrolyzing agents.

Example II

For purposes of comparison with urethane polymer of the invention, polyurethane prepolymers A and B were prepared from the following formulations using the procedure of Example I.

(A)

|   | G. |
|---|---|
| Adipic acid polyester diol (OH value 106.8) | 105.0 |
| 1,3-butylene glycol | 9.0 |
| Trimethylolpropane | 26.8 |
| Cellulose acetobutyrate | 1.4 |
| Toluene | 84.0 |
| Xylene | 84.0 |
| Cellosolve acetate | 23.0 |
| Methylisobutylketone | 89.0 |
| 2,4-toluoylene di-isocyanate | 139.2 |

(B)

| Polypropylene glycol (OH value 109.0) | 103.0 |
|---|---|
| 1,3-butylene glycol | 9.0 |
| Trimethylolpropane | 26.8 |

TABLE I

| Copolymer | Butylene glycol | TMP | CAB | Toluene | Xylene | EGA | MiBK | TDI | MDI |
|---|---|---|---|---|---|---|---|---|---|
| 135.9 | 9.0 | 13.4 | 1.3 | 77 | 77 | 20 | 82 | 97.4 | |
| 135.9 | 9.0 | 23.5 | 1.6 | 100 | 100 | 24 | 106 | 60.1 | |
| 147.5 | | | 0.9 | 53 | 53 | 14 | 56 | 27.8 | |
| 175.0 | | | 1.0 | 68 | 68 | 18 | 72 | | 50.0 |

Coatings were prepared with the moisture-hardening solutions of the above polyurethane prepolymers on phosphated iron sheets of dimension 10 x 50 x 1 mm. by immersion therein. The thickness of the layers was between 25 and 35U.

In the following Table II the number of the batch is given in the first column. There follow the pendulum hardening (Konig), the number of days after which the final hardness was attained, the luster according to Lange's test, the grid section and the Erichsen cupping in mm.

TABLE II

| Batch No. | Hardness according to Konig | Final hardness after, Days | Luster to Lange | Grid section | Erichsen cupping, mm. |
|---|---|---|---|---|---|
| 1 | 106 | 3.8 | 112 | 1-2 | 10.7 |
| 2 | 131 | 6 | 119 | 2 | 9.5 |
| 3 | 107 | 4.5 | 72 | 1 | 14.5 |
| 4 | 76 | 5 | 104 | 2 | 11.9 |

To test the resistance of the said coatings, films were formed on glass plates having a wet film thickness of 500 μm. and after hardening of the films, they were removed by soaking the glass plate in water. The films were then cut into strips and were immersed in solutions of acids or bases for varying periods of time. The strips

| Cellulose acetobutyrate | 1.4 |
|---|---|
| Toluene | 84.0 |
| Xylene | 84.0 |
| Cellosolve acetate | 23.0 |
| Methylisobutylketone | 89.0 |
| 2,4-toluoylene di-isocyanate | 139.2 |

Films were prepared from the polyurethane prepolymers as in Example I and were subjected to the same conditions as in Table III to determine their hydrolysis resistance. In all cases, a complete decomposition of the film occurred indicating poor resistance.

Various modifications of the compositions and process of the invention may be made without departing from the spirit or scope thereof and it is to be understood that the invention is to be limited only as defined in the appended claims.

I claim:

1. A urethane prepolymer having free isocyanate groups prepared by reacting a polyisocyanate with a polyhydroxy polymer of 3,3-bis-(chloromethyl)-oxetane and 3-alkyl-3-hydroxymethyl-oxetane wherein the alkyl has 1 to 24 carbon atoms.

2. The prepolymer of claim 1 wherein the 3-alkyl has 1 to 3 carbon atoms.

3. The prepolymer of claim 1 wherein the polymer contains 40 to 95 mole percent of 3,3-bis-(chloromethyl)-oxetane.

4. The prepolymer of claim 1 wherein the polymer contains 80 to 90 mole percent of 3,3-bis-(chloromethyl)-oxetane.

5. A coating composition comprising a urethane prepolymer of claim 1 dissolved in an organic solvent.

6. The composition of claim 5 which also contains an ingredient selected from the group consisting of soot and inorganic pigment.

7. A urethane prepolymer of claim 1 wherein the polyhydroxy polymer additionally contains 3-chloromethyl-3-hydroxymethyl oxetane.

8. The prepolymer of claim 7 wherein the polymer contains up to 60 percent of 3-chloromethyl-3-hydroxymethyl-oxetane.

References Cited

UNITED STATES PATENTS 3,533,972  10/1970  Pawlak et al. ___ 260—77.5 AP
2,906,738  9/1959   Goldberg _____ 260—78 UA DONALD E. CZAJA, Primary Examiner M. J. WELSH, Assistant Examiner U.S. Cl. X.R.

117—132 B, 142, 148, 155 R; 260—32.8 N, 33.6 UB, 77.5 AP, 77.5 AB, 77.5 AC